Oct. 11, 1949.　　　　　J. RAZEK　　　　　2,484,737
MEASURING APPARATUS

Filed May 19, 1945　　　　　　　　　　　　4 Sheets-Sheet 1

INVENTOR.
Joseph Razek
BY
Jesch and Darbo
Attys.

Oct. 11, 1949.                    J. RAZEK                    2,484,737
                             MEASURING APPARATUS
Filed May 19, 1945                                    4 Sheets-Sheet 2

INVENTOR.
Joseph Razek
BY
Jesch and Darbo
Attys

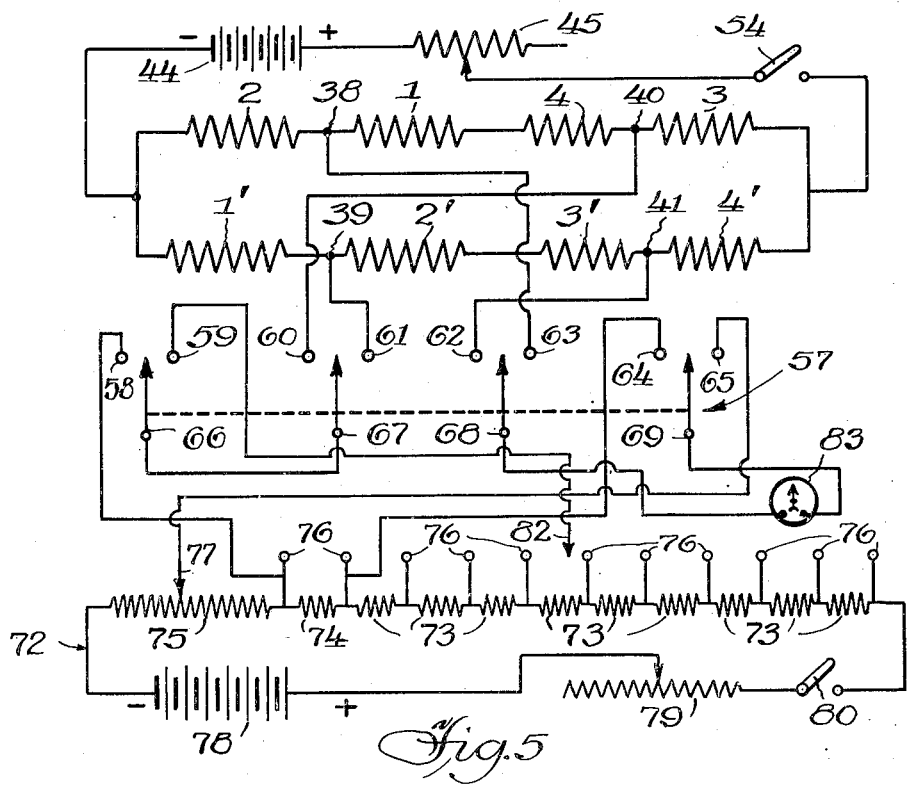
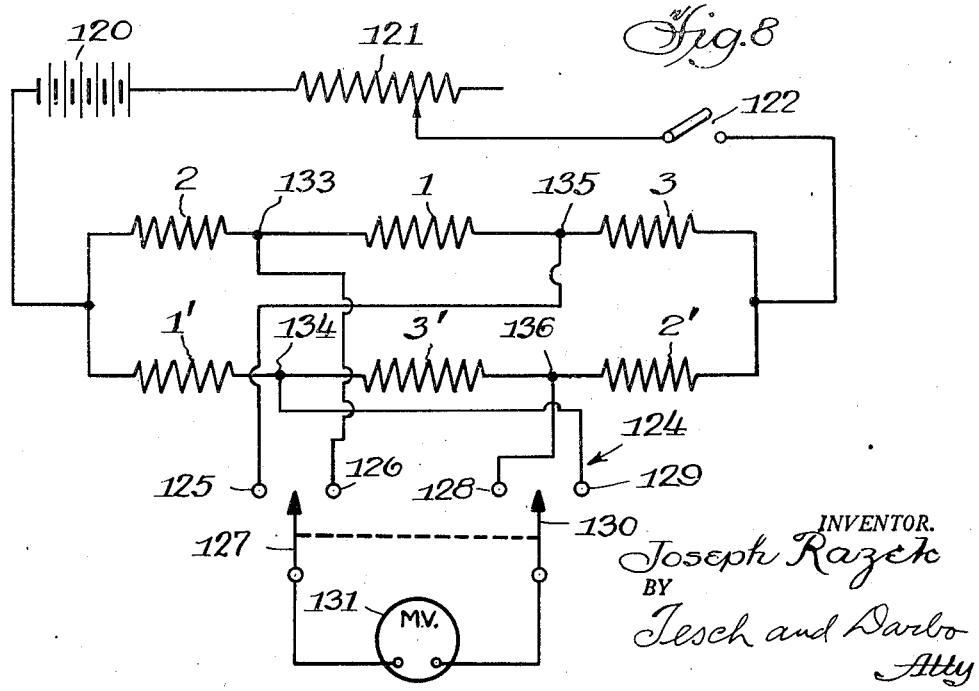

INVENTOR.
Joseph Razek
BY
Lesch and Darbo
Attys.

Patented Oct. 11, 1949

2,484,737

UNITED STATES PATENT OFFICE 2,484,737

MEASURING APPARATUS

Joseph Razek, Llanerch, Pa., assignor, by mesne assignments, to Oliver W. Storey, Wheaton, Ill., as trustee for the partnership of O. W. Storey & Associates, Chicago, Ill.

Application May 19, 1945, Serial No. 594,662

12 Claims. (Cl. 235—61)

This invention relates to an apparatus and method for making measurements. In the field of physical measurement, it is frequently desired to obtain the value of the ratio represented by the expression $$\frac{a-b}{c-d}$$

where $a$, $b$, $c$ and $d$ are equal or proportionate to quantities or other values which it is possible to determine or represent. As a simple example, it may be desired to determine the average rate of flow or consumption of a substance, such as a liquid, or of energy, such as electrical energy, within a desired unit, such as a period of time. As another example, the apparatus may be employed in the determination of the thermal conductivity of materials. Such an apparatus is described and claimed in my copending application Serial No. 594,661, filed May 19, 1945. In said application, the different values represent temperatures and three values, rather than four, are involved. The ratio in such case is $$\frac{a-b}{b-d}$$

which represents a species of the present invention in which the values $b$ and $c$ in the ratio $$\frac{a-b}{c-d}$$

are equal to each other. The present invention covers applications in which one of the values $a$ and $b$ of the expression $$\frac{a-b}{c-d}$$

is equal to one of the values $c$ and $d$.

It is an object of the present invention to provide an improved apparatus and method for making measurements of the character described which is simple in both construction and operation and gives a direct reading of the desired measurement.

In accordance with the invention, means are provided for converting the values $a$, $b$, $c$ and $d$ into proportionate values of electrical resistance, and for giving a direct reading of the desired ratio.

In the drawings:

Figs. 4, 5, 6, 7 and 8 are diagrammatic illustrations of different modifications of the apparatus of the invention.

Figure 1:
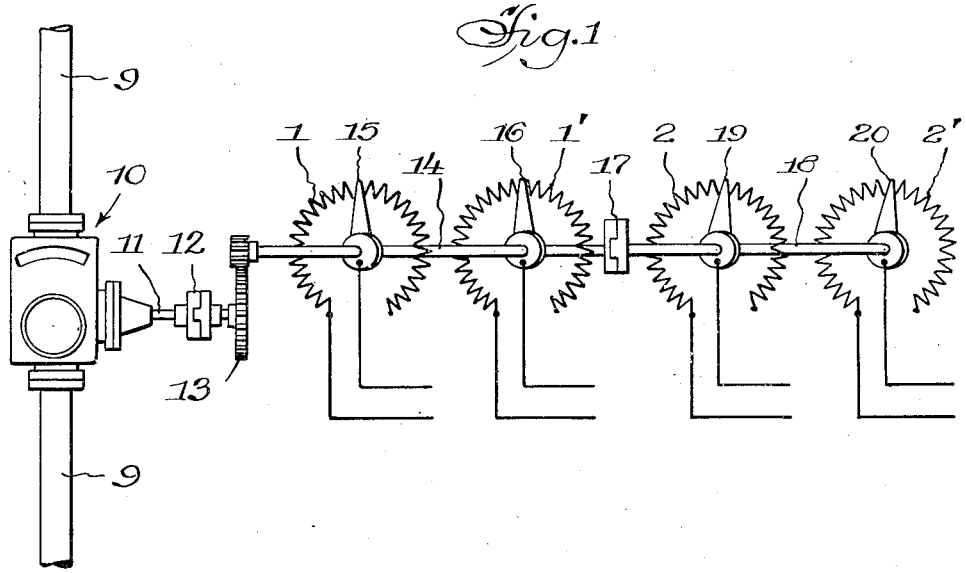
Figs. 1 and 2 are diagrammatic illustrations of apparatus for converting values of different kinds into values of electrical resistance.

The specific example mentioned heretofore, in which the average rate of flow of a liquid during a period of time is determined, is selected for convenience because of its simplicity. Fig. 1 illustrates the apparatus for converting the values representing the quantity of liquid flowing during said period of time into values of electrical resistance. The liquid flows in pipe 9 and is conducted through the meter 10 which measures the quantity of liquid passing through it, such measurement being registered by the turning of shaft 11. The motion of shaft 11 is transmitted through a clutch 12 to reduction gearing 13 and thence to a second shaft 14. The motion of shaft 14 is transmitted to the movable contacts 15 and 16 of variable resistors 1 and 1', which contacts are mounted fixedly on said shaft. The motion of shaft 14 is transmitted through a clutch 17 to a second shaft 18. The movable contacts 19 and 20 of variable resistors 2 and 2' are fixedly mounted on shaft 18 and are moved by said shaft. The variable resistors 1, 1', 2 and 2' are so constructed as to be identical to each other, whereby when the movable contacts thereof are in the same position relative to the resistance elements, the values of resistance between the terminals of the different resistors are equal to each other. The movable contacts 15 and 16 are so mounted on shaft 14 that they are in corresponding positions upon the resistors 1 and 1' at all positions of shaft 14, whereby the values of resistance between the terminals of resistors 1 and 1' are equal to each other at all positions of shaft 14. The same relationship exists between resistors 2 and 2', i. e., the contacts 19 and 20 are so arranged on shaft 18 that the values of the resistance between the terminals of resistors 2 and 2' are equal to each other at all positions of shaft 18.

Figure 2:
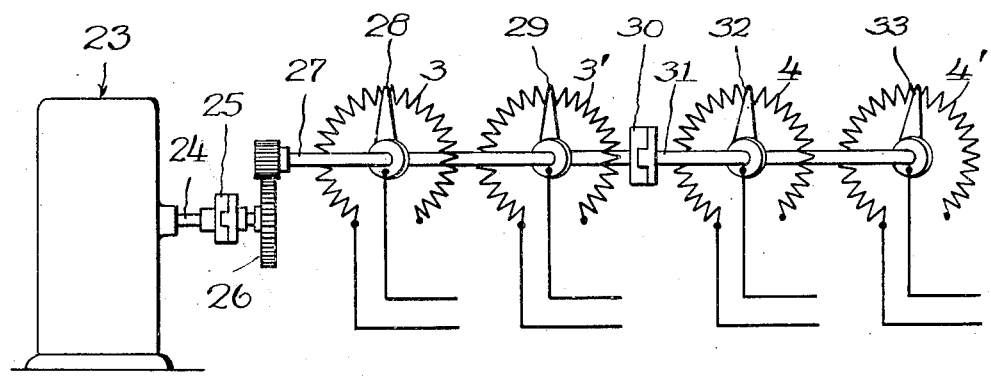

The means for converting values representing time into values of resistance are shown in Fig. 2. They comprise a suitable chronograph 23 which turns a shaft 24, the motion of which is transmitted through a clutch 25 and a reduction gearing 26 to a second shaft 27. The motion of shaft 27 is transmitted to the movable contacts 28 and 29 of variable resistors 3 and 3', and is also transmitted through a clutch 30 to a second shaft 31 which, in turn moves the movable contacts 32 and 33 of resistors 4 and 4'. As with the resistor arrangement of Fig. 1, the resistors 3, 3', 4 and 4' of Fig. 2 are all identical and when the movable contacts thereof are in the same position relative to the resistance elements the values of resistance between the terminals of the several resistors are equal to each other. Contacts 28 and 29 are so arranged on shaft 27 that they occupy the same positions relative to the resistance elements of resistors 3 and 3' respectively, and the same mutual relationship exists with respect to the contacts 32 and 33 of resistors 4 and 4'.

The resistance values of resistors 1, 1', 2 and 2' are caused to be proportionate to the quantity of liquid which has passed through the meter 10 at the beginning and the end, respectively, of the desired interval of time. This is accomplished in the following manner. The clutches 12 and 17 are disengaged and the movable contacts of all of the resistors 1, 1', 2 and 2' are set at the same position, preferably at a position at which little or no resistance is between the terminals of the resistors. The clutches 12 and 17 are then engaged and the movable contacts of all of the resistors move together to increase the resistance between their terminals in accordance with the quantity of liquid passing through the meter 10. Such condition is allowed to continue until the starting time of the desired interval arrives. At the beginning of the interval, the clutch 17 is disengaged. The movable arms 19 and 20 of resistors 2 and 2' become stationary and the value of resistance between the terminals of the resistors is proportionate to the quantity of liquid which has passed through the meter at the beginning of the interval. The movable arms 15 and 16 of resistors 1 and 1' continue to move until the end of the desired period of time when the clutch 12 is disengaged. The value of the resistance included between the terminals of resistors 1 and 1' has increased by an amount proportionate to the quantity of liquid which passed through meter 10 during the said interval, and the difference between the value of resistance between the terminals of resistor 1 or of resistor 1' and the value of resistance between the terminals of resistor 2 or resistor 2' is proportionate to the last mentioned quantity of liquid.

The time interval is measured in a similar manner by the apparatus shown in Fig. 2. The clutches 25 and 30 are first disengaged and the movable contacts 28, 29, 32 and 33 are all adjusted to the same position, preferably one which causes little or no resistance to be included between the terminals of each resistor. The clutches 25 and 30 are then both engaged, and the resistance between the terminals is increased in proportion to the elapsed time. The apparatus may be allowed to operate thus until the starting instant of the desired interval arrives. At the beginning of the interval, clutch 30 is disengaged and at the end of the interval clutch 25 is disengaged. The resistance values of resistors 4 and 4' are proportionate to the time at the beginning of the interval, and the resistance values of resistors 3 and 3' are proportionate to the time at the end of the interval. Means which are not shown may be provided for automatically disengaging clutches 17 and 30 simultaneously at the beginning of the interval and disengaging clutches 12 and 25 at the end of the interval.

Representing the quantity of liquid which has passed through meter 10 at the beginning of the interval by $b$, the quantity which has passed at the end of the interval by $a$, the time at the beginning of the interval by $d$ and the time at the end of the interval by $c$, the average quantity of liquid flowing during the interval is represented by the equation:

$$\frac{a-b}{c-d} \qquad (1)$$

Representing the resistance value of each of resistors 1 and 1' by $R_1$, that of resistors 2 and 2' by $R_2$, that of resistors 3 and 3' by $R_3$ and that of resistors 4 and 4' by $R_4$, $R_1$ is a function of $a$, $R_2$ is a function of $b$, $R_3$ is a function of $c$, and $R_4$ is a function of $d$, and the quantity of liquid flowing during the interval is also represented by the equation:

$$\frac{R_1-R_2}{R_3-R_4} \qquad (2)$$

after due consideration is given to the proper conversion factors, as will be discussed hereinafter.

There are other applications in which physical quantities or values may be converted into proportionate values of resistance, and the apparatus and method which is described hereafter has general application to the determination of the ratio represented by the expression $$\frac{a-b}{c-d}$$

where $a$, $b$, $c$ and $d$ represent physical quantities or values which can be determined or represented.

The direct determination of the difference between the resistance values of two resistors is difficult, and in accordance with the invention, the values of $R_1$, $R_2$, $R_3$ and $R_4$ are converted into proportionate values of voltage and apparatus is provided for determining directly the ratio $$\frac{R_1-R_2}{R_3-R_4}$$

Figure 3:
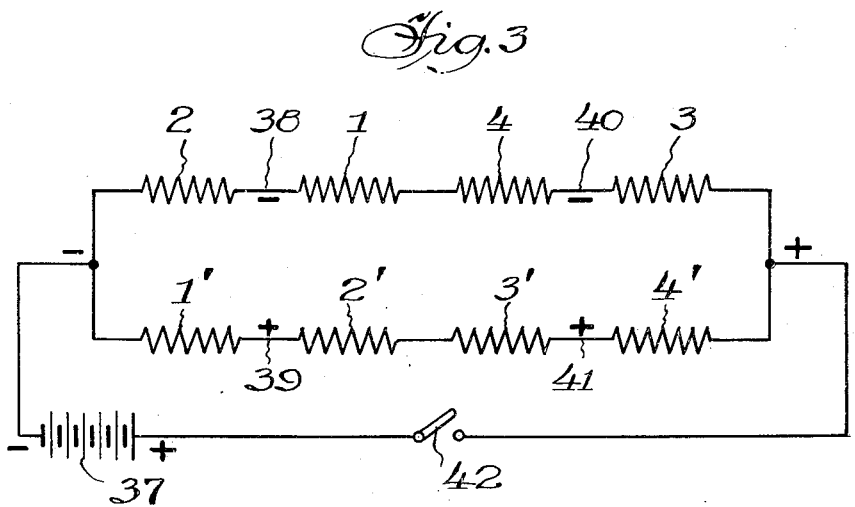
Fig. 3 is a diagrammatic illustration of an electrical arrangement of the resistors in accordance with the invention.

The resistance values are converted into proportionate voltages by causing the same value of current to pass through all of the resistors. This is accomplished by providing the resistors in duplicate, that is, in pairs, the members of each pair having the same resistance values under all circumstances. In the arrangements shown in Figs. 1 and 2, the resistors on each shaft constitute a pair, that is, resistors 1 and 1' constitute one pair, etc. To secure the same value of current to flow through all of the resistors, they are arranged in two groups, as shown in Fig. 3, the resistors of each group being connected together in series and the two groups being connected in parallel with each other to a suitable source of voltage. Each group of series-connected resistors contains one of the resistors of each pair. For example, one group consists of the resistors 1, 2, 3 and 4, with resistors 1 and 3 arranged at the two ends of the groups, respectively. The other group consists of the resistors 1', 2', 3' and 4', with the resistor 2' in the end position corresponding to the position of resistor 1 of the first group, and the resistor 4' in the end position corresponding to the position of resistor 3 of the first group. The two groups are connected in parallel with each other to a suitable source of voltage, indicated as the battery 37. For convenience, a switch 42 is provided for connecting and disconnecting the resistor arrangement from the energy source. Since the total resistance of one group is equal to that of the other, the same value of current flows through all of the resistors. The point in the circuit between resistors 1 and 2 is designated as point 38, that between resistors 3 and 4 as point 40, that between resistors 1' and 2' as point 39 and that between resistors 3' and 4' as point 41. Designating the value of current flowing in the resistors as $i$, the potential difference between points 38 and 39 as $e$ and the potential difference between the points 40 and 41 as $E$, the following relationships exist:

$$e = iR_1 - iR_2 = i(R_1 - R_2) \quad (3)$$
$$E = iR_3 - iR_4 = i(R_3 - R_4) \quad (4)$$

In the specific example herein considered, the resistance value of resistor 1' is greater than that of resistor 2 and the potential at the point 38 is negative with respect to that at the point 39. In the same way, the resistance value of resistor 3 is greater than that of resistor 4' and the potential at the point 40 is negative with respect to that at the point 41. Continuing the analysis, since the value of $i$ is the same in Equations 3 and 4, the following relationship is true:

$$\frac{e}{E} = \frac{R_1 - R_2}{R_3 - R_4} = \frac{a - b}{c - d} \quad (5)$$

Therefore, the ratio which it is desired to determine is equal to the ratio of the potential difference between the points 38 and 39 to the potential difference between the points 40 and 41. It is only necessary that resistors having resistance values which are functions of $a$ and $b$ respectively be arranged at corresponding end positions of one end of the two groups, and resistors having resistance values which are functions of $c$ and $d$ be arranged at corresponding end positions at the other end of the two groups. The remaining resistors may be arranged in any desired position. For example, in Fig. 3, the positions of resistors 1 and 4 may be interchanged from the positions shown, and the positions of resistors 2' and 3' may likewise be interchanged.

Several alternative means for determining the desired ratio are illustrated in Figs. 4, 5, 6 and 7. The invention is not limited to these alternative means, and others will occur to those skilled in the art. In the apparatus illustrated in Fig. 4, the groups of resistors are connected in the same manner as illustrated in Fig. 3 to a suitable source of voltage, such as battery 44, through the rheostat 45 and switch 54. A gang-operated selector switch, designated by the numeral 46, has two sets of two contacts each, the contacts being designated respectively by the numerals 47, 48, 49 and 50. Point 38 of the resistor arrangement is connected to contact 50, point 39 to contact 48, point 40 to contact 47 and point 41 to contact 49. The contacts 47 and 48 are adapted to cooperate with movable contact 51, and contacts 49 and 50 are adapted to cooperate with movable contact 52. The movable contacts 51 and 52 are connected respectively to the terminals of the millivoltmeter 53.

Figure 4:
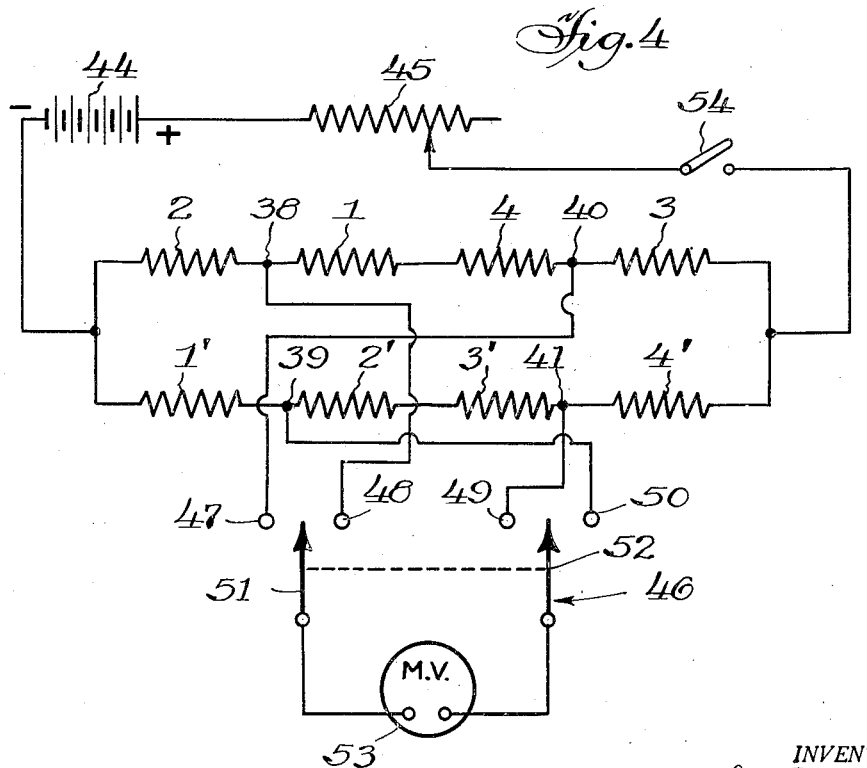

In operating the apparatus of Fig. 4, with switch 54 closed, the movable contacts 51 and 52 are first brought into contact with contacts 47 and 49, thereby connecting millivoltmeter 53 between the points 40 and 41. The millivoltmeter, in this position, gives a reading of the difference between the potential of point 41 and that of point 40, i. e., a reading of the voltage E. The rheostat 45 may be adjusted to provide a reading on millivoltmeter 53 which may be considered unity or 100%. With the setting of rheostat 45 unchanged, the movable contacts 51 and 52 are now shifted so as to make connection with contacts 48 and 50, thereby connecting millivoltmeter 53 between the points 38 and 39 and causing said millivoltmeter to give a reading of the difference between the potential of point 39 and that of point 38, i. e., a reading of the voltage $e$. With the first reading (of the voltage E) reduced to unity or 100%, the second reading (of the voltage $e$) is a direct reading, in units in the one case and in percent in the other, of the ratio $e/E$. In the specific example of measurement described heretofore, the reading is a direct measurement of the quantity of liquid flowing in pipe 9 during the particular interval of time chosen. It is necessary to convert the reading of voltages $e$ and E into units of liquid quantity and time respectively. This requires but a simple mathematical computation, after which the millivoltmeter can be read directly or the readings converted directly into units of quantity per unit of time.

In the apparatus illustrated in Fig. 5 the same arrangement of resistors and energy supply therefor is used as has been described heretofore. A gang-operated selector switch, designated generally by the numeral 57, has four sets of two contacts each, said contacts being designated individually by the numerals 58 to 65, inclusive. Each set of two contacts is adapted to cooperate with a movable contact, said movable contacts being designated by the numerals 66, 67, 68 and 69, respectively.

A potentiometer, designated generally by the numeral 72, is provided, which is divided into eleven equal sections, the first nine of which are designated by the numeral 73 and the remaining two of which are designated by the numerals 74 and 75, respectively. The ends of the sections 73 and 74 are connected to tap terminals 76, and section 75 has a movable contact 77. A second movable contact 82 is adapted to make selective contact with the terminals 76. Voltage is supplied to the potentiometer 72 by a suitable source of energy, such as the battery 78, through a rheostat 79 and a switch 80.

The contact 58 of selector switch 57 is connected to the potentiometer tap 76 located between sections 74 and 75, and contact 59 is connected to the movable contact 82. Contact 60 is connected to the inter-resistor point 40, and contacts 61, 62 and 63 are connected, respectively, to the inter-resistor points 39, 41 and 38, respectively. Contact 64 is connected to the potentiometer tap 76 between potentiometer sections 74 and 73, and contact 65 is connected to the movable potentiometer contact 77.

The movable contacts 66 and 67 of selector switch 57 are connected together directly, and movable contacts 68 and 69 are connected together through the galvanometer 83.

In the operation of the apparatus of Fig. 5, the resistor units are first operated through the desired interval of time as described in connection with the apparatus of Figs. 1 and 2. The switches 54 and 80 are then closed and the movable contacts 66, 67, 68 and 69 are moved into contact with contacts 58, 60, 62 and 64. In this position, the points 40 and 41 are connected together by a series circuit containing potentiometer section 74 and galvanometer 83, the arrangement being such that the voltage across the potentiometer opposes the potential difference between points 40 and 41. The rheostat 79 is then adjusted until the galvanometer 83 reads zero. Under such conditions, the voltage across section 74 equals the potential difference between the points 40 and 41, i. e., the voltage E. It is unnecessary at this time to take any reading.

Without disturbing the adjustment of rheostat 79, the movable contacts 66, 67, 68 and 69 are then moved into engagement with stationary contacts 59, 61, 63 and 65. In this position, the inter-resistor points 38 and 39 are connected together by a series circuit containing galvanometer 83 and the portion of potentiometer 72 between the movable contacts 77 and 82. The arrangement is such that the voltage supplied by the potentiometer opposes the potential difference between the points 38 and 39. Contacts 77 and 82 are adjusted until galvanometer 83 reads zero. In the latter position of the apparatus, the potential difference between the contacts 77 and 82 equals the potential difference between the inter-resistor points 38 and 39, i. e., the voltage $e$. The ratio $e/E$ is equal to the ratio of the voltage between contacts 77 and 82 when the potentiometer is in the second position described heretofore to the voltage across section 74 when the potentiometer is in the first position. In practice, contacts 77 and 82 may be mounted upon dials and indicia employed indicating each of the sections 73 and 74 as one unit and dividing the section 75 into 10 equal portions. The voltage E across section 74 may, therefore, be considered one unit and the voltage $e$ between contacts 77 and 82, and likewise the ratio $e/E$ will be given directly by the reading upon the dials, in units and tenths. For any specific application, mathematical conversion computations can be performed to convert the reading upon the dial into the desired units, so that a direct reading, as for example, of units of quantity per unit of time, can be read upon the dials. The number of sections 73 shown in potentiometer 72 is entirely arbitrary, and any desired number may be used. The apparatus of Fig. 5 exhibits somewhat greater accuracy than that of Fig. 4 since no energy is taken from the series-parallel arrangement of resistors.

Figure 6:
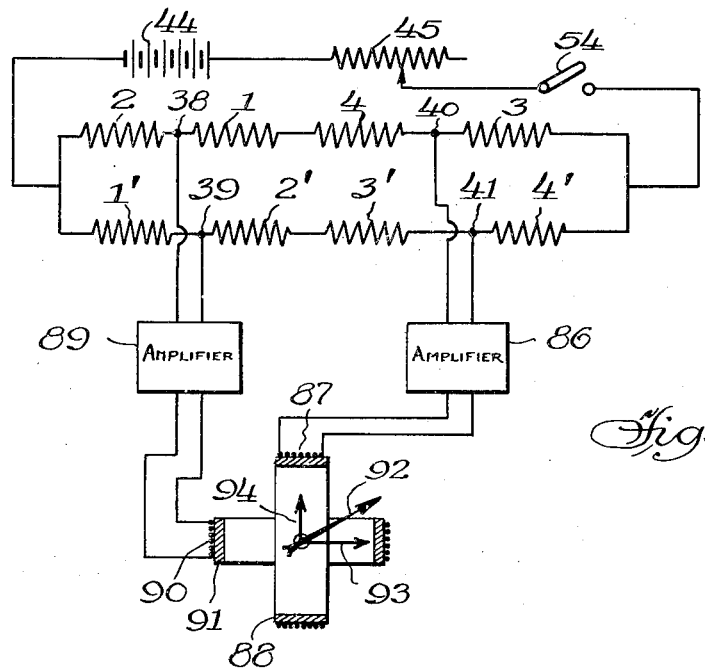

In the apparatus illustrated in Fig. 6, the arrangement of resistors and the supply circuit therefor is the same as in the previous modification, and the inter-resistor points 40 and 41 are connected, respectively, to the input terminals of a well known thermionic type of amplifier 86, which provides a current output proportional to the input voltage. The output terminals of amplifier 86 are connected to a winding 87 which is mounted upon a suitable cylindrical support 88 of nonmagnetic material. In a similar manner, inter-resistor points 38 and 39 are connected to the input terminals of an amplifier 89 similar to amplifier 86, and the output terminals of amplifier 89 are connected to a winding 90 which is mounted upon cylindrical support 91 similar to support 88, and is arranged substantially concentric with winding 87 and with its axis at right angles to that of winding 87. A magnetic needle 92 is mounted in freely pivotal manner substantially at the point where the axes of the two windings intersect. The axis of the support for needle 92 extends in a direction perpendicular to the axes of both of windings 87 and 90. Amplifiers 86 and 89 are so adjusted as to have the same relation between input voltage and output current, and windings 87 and 90 are identical.

In operation, with switch 54 closed, the current flowing in winding 87 is proportional to the voltage E, i. e., the potential difference between points 40 and 41. In the same way, the current flowing in winding 90 is proportional to the voltage $e$, i. e., the potential difference between points 38 and 39. A magnetic field is generated by the current in winding 87, said field extending in a horizontal direction, as indicated by the arrow 93, at the point of support of needle 92, in the position of the apparatus as illustrated in Fig. 6. In a similar way, a magnetic field is generated by the current in winding 90, said field extending in a vertical direction, as indicated by the arrow 94. The magnetic fields have relative magnitudes in proportion to the relative values of the voltages E and $e$, which magnitudes are indicated by the relative lengths of the arrows 93 and 94. Needle 92 assumes a position coinciding with the direction of the resultant field, as indicated in Fig. 6. A scale (not shown) may be provided for the needle 92 so calibrated as to give readings in terms of the desired ratio $e/E$.

Figure 7:
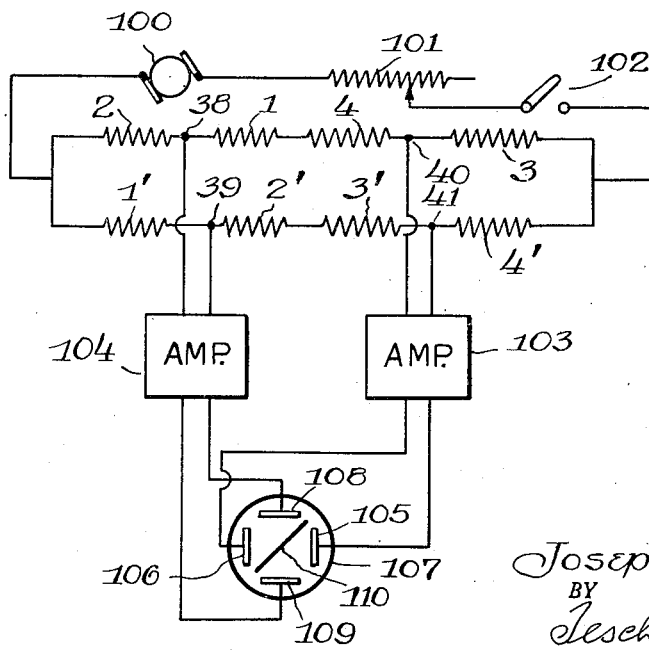

In the apparatus illustrated in Fig. 7, the arrangement of resistors is the same as has been described heretofore, except that the energy supply therefor comprises an alternating current generator 100 and a rheostat 101 and switch 102 connected in series therewith, whereby an alternating voltage is impressed across the series-parallel arrangement of resistors. The generator 100 preferably provides alternating voltage of a relatively low frequency such as ordinary 60 cycle energy, and the resistors, being substantially free of inductive and capacitive reactance, cause the current throughout the system to be substantially in phase with the voltage. The inter-resistor points 40 and 41 are connected to the input terminals of an amplifier 103 having characteristics such that its output is an alternating voltage proportional to the alternating voltage input. In the same manner, inter-resistor points 38 and 39 are connected to the input terminals of a second amplifier 104, similar to amplifier 103. The output terminals of amplifier 103 are connected to the two horizontally opposed deflection plates 105 and 106 of a cathode ray oscilloscope 107, and the output terminals of amplifier 104 are connected to the two vertically opposed deflection plates 108 and 109 of oscilloscope 107. The amplifiers 103 and 104 are so constructed as to have identical gain characteristics and the oscilloscope 107 is so constructed that voltage between plates 105 and 106 produces the same magnitude of beam deflection as does an equal voltage between plates 108 and 109.

In operation, with switch 102 closed, the beam emitted by the cathode of oscilloscope 107 describes a pattern upon the fluorescent screen thereof which is a straight line, the direction of which is dependent upon the relative values of the voltages $e$ and E. The voltage E causes horizontal deflection, as the oscilloscope is viewed in Fig. 7, and the voltage $e$ causes vertical deflection. The line 110 represents the pattern of the beam, and the ratio $e/E$ is equal to the tangent of the angle made by the line 110 with a line extending horizontally. A scale may be provided upon the oscilloscope which will give a direct reading of the desired ratio.

An instrument has recently been developed which is adapted to indicate the ratio between the values of two currents or voltages, and is described and illustrated on pages 128 and 129 of volume 18, No. 2 of "Instruments" (February 19, 1945). The inter-resistor points 38, 39, 40 and 41 may be connected to the proper terminals of such ratio meter and an indication of the ratio $e/E$, thereby obtained.

The apparatus of Figs. 1 and 2 may be operated in an alternative manner. Clutches 12, 17, 25 and 30 may all be disengaged and the movable contacts of all of the resistors placed at the same positions relative to the resistance elements thereof. Such condition may be allowed to continue until the beginning of the desired interval, when clutches 12 and 25 are engaged while clutches 17 and 30 are allowed to remain disengaged. Such condition is maintained until the end of the desired period when clutches 12 and 25 are disengaged.

Under such operation, only three values need to be considered, rather than four as described heretofore. The values of time and liquid quantity at the beginning of the period can both be considered to be zero and are represented by the resistance values of resistors 2, 2', 4 and 4', all of which values are equal. Employing the same designations as heretofore, i. e., R₁ for the resistance value of resistors 1 and 1', etc., the only values which are involved are $a$, $b$ and $c$, which are represented by $R_1$, $R_2$ and $R_3$. This is a species of the invention in which the values $b$ and $d$ of the expression $$\frac{a-b}{c-d}$$

are equal to each other. The invention also includes the situation in which none of the values in the numerator of the fraction which expresses the ratio is equal to a value in the denominator, but one value in the numerator and one in the denominator can be represented by the resistors of one pair or by resistors having equal values of resistance.

The quantity of liquid which passed through meter 10 during the interval is represented by the expression $$R_1 - R_2 \qquad (6)$$

and the time interval itself is represented by the expression $$R_3 - R_2 \qquad (7)$$

The average quantity of liquid passing through the meter per unit of time is represented by the relationship:

$$\frac{R_1 - R_2}{R_3 - R_2} \qquad (8)$$

The electrical arrangement for the last mentioned type of operation may be as shown in Fig. 8. Resistors 4 and 4' may be omitted from such arrangement and resistors 1, 2 and 3 are connected together in series to form one group, with resistors 2 and 3 at the ends of the group, and resistors 1', 2' and 3' are connected together in series to form the other group with resistors 2' in the position corresponding to that of resistor 3 of the first group and resistor 1' in the position corresponding to that of resistor 2 of the first group. The two groups are connected in parallel with each other to a source of voltage, such as battery 120 through rheostat 121 and switch 122. The gang-operated selector switch 124 has contacts 125 and 126 adapted to cooperate with movable contact 127 and contacts 128 and 129 adapted to cooperate with movable contact 130. The movable contacts 127 and 130 are connected to the terminals of millivoltmeter 131.

Contact 126 is connected to the point 133 between resistors 1 and 2 and contact 129 is connected to the point 134 between resistors 1' and 3'. Contact 125 is connected to the point 135 between resistors 1 and 3 and contact 128 is connected to the point 136 between the resistors 2' and 3'. The potential difference between points 135 and 136 will be designated by E and that between points 133 and 134 by $e$.

In operation, the switch 122 is closed and movable contacts 127 and 130 are brought into contact with contacts 125 and 128, thereby connecting millivoltmeter 131 between the points 135 and 136. The rheostat 121 is adjusted to give a reading upon the millivoltmeter which may be considered unity. This is the voltage E. The movable contacts 127 and 130 are now moved into contact with contacts 126 and 129, in which position the millivoltmeter is connected between points 133 and 134 and the millivoltmeter gives a reading of the voltage $e$.

The apparatus of the invention provides a simple means for quickly determining the comparative values of the differences represented by the expressions "$a-b$" and "$c-d$" or of the differences represented by the expressions "$R_1-R_2$" and "$R_3-R_4$." It also may be used for indicating the comparative resistance values of two resistors. For example, Equation 3 shows that the potential difference $e$ between points 38 and 39 is equal to the difference between the potential drops across resistors 1' and 2 and, since the same value of current flows in both resistors, the potential difference $e$ is a measure of the comparative resistance values of the said resistors. The invention has wide field of application. While but a few modifications of the invention are described and illustrated, the invention is not limited thereto, and others will occur to those skilled in the art and are included within the spirit of the invention as the same is set forth in the appended claims.

What is claimed is:

1. Apparatus of the character described, comprising, in combination, a plurality of pairs of resistors, the resistance values of the resistors of each pair being substantially equal to each other, said resistors being arranged electrically in two groups, each group comprising one of the resistors of each of said pairs, the resistors of each group being connected together in series, said groups of series-connected resistors being connected in parallel with each other to a source of electrical energy, and means for determining the ratio of the potential difference between the corresponding end-most inter-resistor points at one end of said groups to the potential difference between the corresponding end-most inter-resistor points at the other end of said groups.

2. Apparatus of the character described, comprising, in combination, a plurality of pairs of resistors, the resistance values of the resistors of each pair being substantially equal to each other, said resistors being arranged electrically in two groups, each group comprising one of the resistors of each of said pairs, the resistors of each group being connected together in series, said groups of series-connected resistors being connected in parallel with each other to a source of electrical energy, the resistors of each pair of resistors being located respectively at different positions in the separate groups of resistors, and means for determining the ratio of the potential difference between the corresponding end-most inter-resistor points at one end of said groups to the potential difference between the corresponding end-most inter-resistor points at the other end of said groups.

3. Apparatus as claimed in claim 2, in which the number of pairs of resistors is four.

4. Apparatus as claimed in claim 2, in which the number of pairs of resistors is three.

5. Apparatus for determining the comparative values of the two differences represented by the expressions "$R_1-R_2$" and "$R_3-R_4$," where $R_1$, $R_2$, $R_3$ and $R_4$ are values of resistance, comprising, in combination, a plurality of pairs of resistors, each said resistor pair being so constructed that the resistors thereof have resistance values substantially equal to each other, the resistors of each said pair having a resistance value equal to a different one of the values $R_1$, $R_2$, $R_3$ and $R_4$, said resistors being arranged electrically in two groups, each group comprising one of the resistors of each of said pairs, the resistors of each group being connected together in series, said groups of series-connected resistors being connected in parallel with each other to a source of electrical energy, resistors having the resistance values $R_1$ and $R_2$ being located respectively at corresponding end positions at one end of said groups, and resistors having the resistance values $R_3$ and $R_4$ being located at corresponding end positions at the other end of said groups, and means for indicating the values, relative to each other, of the potential difference between the corresponding end-most inter-resistor points at one end of said groups of resistors and the potential difference between the corresponding end-most inter-resistor points at the other end of said groups.

6. The apparatus as claimed in claim 5, in which one of the resistance values $R_1$ and $R_2$ is equal to one of the resistance values $R_3$ and $R_4$.

7. Apparatus for determining the comparative values of the two differences represented by the expressions "$R_1-R_2$" and "$R_3-R_4$," where $R_1$, $R_2$, $R_3$, and $R_4$ are values of resistance, comprising, in combination, a plurality of pairs of resistors, the resistance values of the resistors of each said pair being substantially equal to each other, the resistors of each said pair having a resistance value equal to a different one of the values $R_1$, $R_2$, $R_3$ and $R_4$, said resistors being arranged electrically in two groups, each group comprising one of the resistors of each of said pairs, the resistors of each group being connected together in series, said groups of series-connected resistors being connected in parallel with each other to a source of electrical energy, means for indicating the values, relative to each other, of the difference between the potential drop across a resistor having the resistance value $R_1$ and the potential drop across a resistor having the resistance value $R_2$ and the difference between the potential drop across a resistor having the resistance value $R_3$ and the potential drop across a resistor having the resistance value $R_4$.

8. Apparatus for determining the comparative values of the two differences represented by the expressions "$R_1-R_2$" and "$R_3-R_4$," where $R_1$, $R_2$, $R_3$ and $R_4$ are values of resistance, comprising, in combination, a plurality of pairs of resistors, the resistance values of the resistors of each said pair being substantially equal to each other, the resistors of each said pair having a resistance value equal to a different one of the values $R_1$, $R_2$, $R_3$ and $R_4$, said resistors being arranged electrically in two groups, each group comprising one of the resistors of each of said pairs, the resistors of each group being connected together in series, the resistors of each pair of resistors being located respectively at different positions in the separate groups of resistors, means for causing current of substantially equal value to flow through both of said groups, means for indicating the values, relative to each other, of the difference between the potential drops across the resistors occupying corresponding end positions at one end of said groups and the difference between the potential drops across the resistors occupying corresponding end positions at the other end of said groups.

9. Apparatus for determining the relative resistance values of two resistors having resistance values $R_1$ and $R_2$, comprising, in combination, a plurality of pairs of resistors, the resistance values of the resistors of each pair being substantially equal to each other, the resistors of one of said pairs having the resistance value $R_1$ and the resistors of a second pair having the resistance value $R_2$, said resistors being arranged electrically in two groups, each group comprising one of the resistors of each pair, the resistors of each group being connected together in series, said groups of series-connected resistors being connected in parallel with each other to a source of electrical energy, and means for measuring the difference between the potential drop across a resistor having the resistance value $R_1$ and a resistor having the resistance value $R_2$.

10. Apparatus for determining the comparative values of the two differences represented by the expressions "$a-b$" and "$c-d$," where $a$, $b$, $c$ and $d$ represent values, comprising, in combination, a plurality of pairs of resistors, each said resistor pair being so constructed that the resistors thereof have resistance values substantially equal to each other, means for causing the resistors of each said pair to assume a resistance value proportional to a different one of the values $a$, $b$, $c$ and $d$, said resistors being arranged electrically in two groups, each group comprising one of the resistors of each of said pairs, the resistors of each group being connected together in series, said groups of series-connected resistors being connected in parallel with each other to a source of electrical energy, resistors representing the values $a$ and $b$ being located respectively at corresponding end positions at one end of said groups, and resistors representing the values $c$ and $d$ being located at corresponding end positions at the other end of said groups, and means for indicating the values, relative to each other, of the potential difference between the corresponding end-most inter-resistor points at one end of said groups of resistors and the potential difference between the corresponding end-most inter-resistor points at the other end of said groups.

11. Apparatus for determining the ratio between the two differences represented by the expressions "$a-b$" and "$c-d$," where $a$, $b$, $c$ and $d$ represent values, comprising, in combination, a plurality of pairs of resistors, the resistance values of the resistors of each said pair being substantially equal to each other, means for causing the resistors of each said pair to assume a resistance value proportional to a different one of the values $a$, $b$, $c$ and $d$, said resistors being arranged electrically in two groups, each group comprising one of the resistors of each of said pairs, the resistors of each group being connected together in series, the resistors of each pair of resistors being located respectively at different positions in the separate groups of resistors, means for causing current of substantially equal value to flow through both of said groups, means for indicating the values, relative to each other, of the difference between the potential drops across the resistors at corresponding end positions at one end of said groups and the difference between the potential drops across the resistors at corresponding end positions at the other end of said groups.

12. Apparatus for determining the comparative values of the two differences represented by the expressions "$a-b$" and "$c-d$," where $a$, $b$, $c$ and $d$ represent values, comprising, in combination, a plurality of pairs of resistors, means for causing the resistance values of the resistors of each said pair to be substantially equal to each other, means for causing the resistors of each said pair to assume a resistance value proportional to a different one of the values $a$, $b$, $c$ and $d$, means for causing current of substantially equal value to flow through all of said resistors, means for indicating the values, relative to each other, of the difference between the potential drop across a resistor representing the value $a$ and the potential drop across a resistor representing the value $b$ and the difference between the potential drop across a resistor representing the value $c$ and the potential drop across a resistor representing the value $d$.

JOSEPH RAZEK.

REFERENCES CITED

The following references are of record in the file of this patent:

UNITED STATES PATENTS

| Number | Name | Date |
| --- | --- | --- |
| 2,108,146 | Simpson | Feb. 15, 1938 |

OTHER REFERENCES

Electrical Measurements by Laws, page 157, Figure 83, paragraph on the Potentiometer Method. Published by McGraw-Hill, copyright 1917, first edition.